US012649244B2

(12) United States Patent
Tawata

(10) Patent No.: US 12,649,244 B2
(45) Date of Patent: Jun. 9, 2026

(54) PAINTING ROBOT

(71) Applicant: ABB SCHWEIZ AG, Baden (CH)

(72) Inventor: Takahiro Tawata, Tokyo (JP)

(73) Assignee: ABB Schweiz AG, Baden (CH)

( * ) Notice: Subject to any disclaimer, the term of this patent is extended or adjusted under 35 U.S.C. 154(b) by 122 days.

(21) Appl. No.: 17/755,272

(22) PCT Filed: Sep. 4, 2020

(86) PCT No.: PCT/JP2020/033549
§ 371 (c)(1),
(2) Date: Apr. 25, 2022

(87) PCT Pub. No.: WO2022/049718
PCT Pub. Date: Mar. 10, 2022

(65) Prior Publication Data
US 2024/0316787 A1 Sep. 26, 2024

(51) Int. Cl.
*B25J 11/00* (2006.01)
*B05B 1/30* (2006.01)
(Continued)

(52) U.S. Cl.
CPC ......... *B25J 11/0075* (2013.01); *B05B 1/3093* (2013.01); *B05B 13/0431* (2013.01); *B05B 15/40* (2018.02); *B25J 19/0079* (2013.01)

(58) Field of Classification Search
CPC ..... B05B 13/043; B05B 1/3093; B05B 15/40; B05B 13/0431
See application file for complete search history.

(56) References Cited

U.S. PATENT DOCUMENTS 5,943,078 A * 8/1999 Nishimoto ................. B41J 2/18
347/89
2008/0158304 A1 7/2008 Eto
(Continued)

FOREIGN PATENT DOCUMENTS

CN 106457291 A 2/2017
CN 107617539 A 1/2018
(Continued)

OTHER PUBLICATIONS

Machine translation of JP2017-193062A (Year: 2017).*
(Continued)

*Primary Examiner* — Dah-Wei D. Yuan
*Assistant Examiner* — Stephen A Kitt
(74) *Attorney, Agent, or Firm* — Greenberg Traurig, LLP

(57) ABSTRACT

A painting robot which can prevent the introduction of air from the nozzles into paint during the color change of paint and filling of paint and can prevent the acceleration of wear of the pump, and sufficiently remove dissolved gas from the paint. The painting robot includes a paint supply path connected to the paint supply side of the nozzle head and a return flow path configured to recover the paint not discharged from the nozzles. Further, the painting robot includes a first filter configured to remove foreign matter in the paint and a second filter configured to separate dissolved gas from the paint. When paint is not discharged from the nozzle head, the control unit opens the on-off valve and circulates the paint to the bypass flow path.

13 Claims, 10 Drawing Sheets

(51) Int. Cl.
　　*B05B 13/04*　　　　(2006.01)
　　*B05B 15/40*　　　　(2018.01)
　　*B25J 19/00*　　　　(2006.01)

(56)　　　　　　　References Cited

U.S. PATENT DOCUMENTS

| 2009/0167817 | A1 * | 7/2009 | Orr | .................... B29C 64/106 |
| | | | | 347/37 |
| 2018/0169688 | A1 | 6/2018 | Medard | |

FOREIGN PATENT DOCUMENTS

| EP | 2185293 | B1 | | 6/2012 |
| JP | 2008221098 | A | | 9/2008 |
| JP | 2012-96524 | A | | 5/2012 |
| JP | 2014-111307 | A | | 6/2014 |
| JP | 5572778 | B2 | | 8/2014 |
| JP | 2017193062 | A | * | 10/2017 |
| JP | 2020-501883 | A | | 1/2020 |
| JP | 6690380 | B2 | | 4/2020 |
| WO | 2009059753 | A1 | | 5/2009 |
| WO | 2017196839 | A1 | | 11/2017 |

OTHER PUBLICATIONS

International Search Report and Written Opinion, issued by the ISA/JP Japan Patent Office, regarding corresponding patent application Serial No. PCT/JP2020/033549; dated Nov. 10, 2020; 9 pages (English ISR).

* cited by examiner

53

53

53

PAINTING ROBOT

CROSS-REFERENCE TO RELATED APPLICATIONS

This is a national stage application which claims priority to International patent application Serial No.: PCT/JP2020/033549, filed on Sep. 4, 2020; and which is herein incorporated by reference in its entirety.

FIELD

The present invention relates to a painting robot.

BACKGROUND

In painting lines of automobiles and other vehicles, robot painting using robots has become the mainstream. In such robot painting, a painting machine (rotary atomizing type painting machine) in which a rotary atomizing type painting head is mounted at the tip of a multi-joint robot is used. In addition, for example, as disclosed in Patent Literature 1, a configuration with a painting agent returning device (11) so as to circulate unnecessary painting agent in a print head (10) is disclosed.

CITATION LIST

Patent Literature

Patent Literature 1: Japanese Unexamined Patent Application Publication (Translation of PCT Application) No. 2020-501883

SUMMARY

Technical Problem

Meanwhile, Patent Literature 1 discloses a configuration in which for example a valve needle (5) is driven in a print head (10), by means of an electromagnetic actuator or a piezoelectric actuator, thereby releasing or closing the nozzle (1). Therefore, in the configuration disclosed in Patent Literature 1, the print head (10) discharges the paint by a method different from the ink-jet method in which paint is pushed out by deformation of the piezoelectric elements.

Here, it is configured to recycle the painting agent not discharged from the nozzle (1) via the painting agent returning device (3, 11). However, the print head (10) disclosed in Patent Literature 1 is not an ink-jet type print head as described above. However, when an ink-jet type print head (nozzle head) is used for painting a vehicle, air is sometimes introduced from the nozzle through the nozzle during color change of the paint and filling of the paint into the nozzle head. Once air is introduced in this way, air which is difficult to be exhausted will accumulate inside the nozzle, causing the problem that it is difficult to push the paint out by the driving of the piezoelectric element. However, such a problem is difficult to solve according to Patent Literature 1.

In addition, there is also a problem that when changing the color of paint and filling the nozzle head with paint, a pump is used to push out the paint or pull in the paint from the nozzle head, thereby the wear of the pump will be accelerated if such pushing out and pulling in of paint are frequently used. Such a problem is also difficult to solve in Patent Literature 1.

In addition, gas (dissolved gas) is usually dissolved in the paint, however in the configuration disclosed in Patent Literature 1, it is difficult to remove (deaerate) the dissolved gas from the paint.

Given the above-mentioned situation, the present invention has been made to provide a painting robot which can prevent the introduction of air from the nozzle into the paint during the color change of paint and filling of paint, and can prevent the acceleration of wear of the pump, and sufficiently remove dissolved gas from the paint.

Solution to Problem

In order to solve the above problems, according to a first perspective of the present invention, a painting robot configured to discharge paint toward the painting object from a nozzle to perform painting is characterized by including: a nozzle head including a plurality of nozzles and discharging paint from the nozzles by driving of a piezoelectric substrate; a paint supply path connected to the paint supply side of the nozzle head; a return flow path connected to the paint exhaust side of the nozzle head and configured to recover the paint not discharged from the nozzles; a first filter provided in the intermediate portion of the paint supply path and configured to remove foreign matter in the paint; and a second filter provided on the downstream side of the paint supply path compared to the first filter and configured to separate dissolved gas from the paint, a bypass flow path configured to circulate paint in parallel with the nozzle head is provided on the downstream side of the paint supply path compared to the first filter, and an on-off valve 116 opening and closing under the control of the control unit is provided in the bypass flow path, When paint is not discharged from the nozzle head, the control unit opens the on-off valve and circulates the paint to the bypass flow path, the return flow path is connected to at least a location on the upstream side of the second filter of the paint supply path, and the paint which has circulated through the bypass flow path is again supplied to the paint supply path via the return flow path, so that the paint passes through at least the second filter again.

In addition, in the above-mentioned invention, it is preferable that, on the upstream side of the first filter, a pressurizing device is provided, which applies a positive pressure to the paint, and on the downstream side of the paint supply path as compared to the pressurizing device and on the upstream side of the first filter, a pressure sensor is provided, which detects the pressure of the paint flowing through the paint supply path, and based on the detection signal sent by the pressure sensor to the control unit, the operation of the pressurizing device is controlled so that the pressurizing device discharges paint at a predetermined pressure.

In addition, in the above-mentioned invention, it is preferable that, the nozzle head is mounted on the tip side of the robot arm configured to move the nozzle head to the desired position and the desired posture, and the first filter and the second filter are mounted to the intermediate portion of the robot arm.

In addition, in the above-mentioned invention, it is preferable that, the second filter includes a hollow fiber membrane, the second filter includes a sealed case, and the robot arm is provided with an engagement portion engaged with a side surface of the case.

In addition, in the above-mentioned invention, it is preferable that, the nozzle head is provided with a circulation path in which, when the paint supplied to the nozzle head is not discharged from the nozzles, the paint returns to the return flow path.

Advantageous Effects of Invention

According to the present invention, a painting robot which can prevent the introduction of air from the nozzles into paint during the color change of paint and filling of paint and can prevent the acceleration of wear of the pump, and sufficiently remove dissolved gas from the paint is provided.

DETAILED DESCRIPTION OF EMBODIMENTS

Hereinafter, painting robots 10 of the embodiments of the present invention are described with reference to the drawings. Additionally, in the following description, X direction is set to the long direction of the nozzle discharging surface 52 (nozzle head 53), the X1 side is the right side in FIG. 2, and the X2 side is the left side in FIG. 2 as needed. In addition, Y direction is set to the short direction (width direction) of the nozzle discharging surface 52 (nozzle head 53), the Y1 side is the upper side of the paper surface in FIG. 2, and the Y2 side is the lower side of the paper surface in FIG. 2.

The painting robot 10 according to the present embodiment "paints" a painting object, such as a vehicle or a vehicle part (hereinafter, a vehicle part that is a part of a vehicle is also described as a vehicle), which is located in a painting line of an automobile manufacturing plant, and it is aimed at forming a painting film on the surface of the painting object, providing its surface with protection and aesthetics. Therefore, it is necessary to paint approaching vehicles moving along the painting line every prescribed time with desired painting quality within a certain time period.

In addition, in the painting robot 10 of the present embodiment, not only the above-mentioned painting film can be formed, but also various designs and images can be formed on painting objects such as vehicles and vehicle parts.

(1-1. Overall Configuration of Ink-Jet Type Vehicle Painting Machine)

Figure 1:
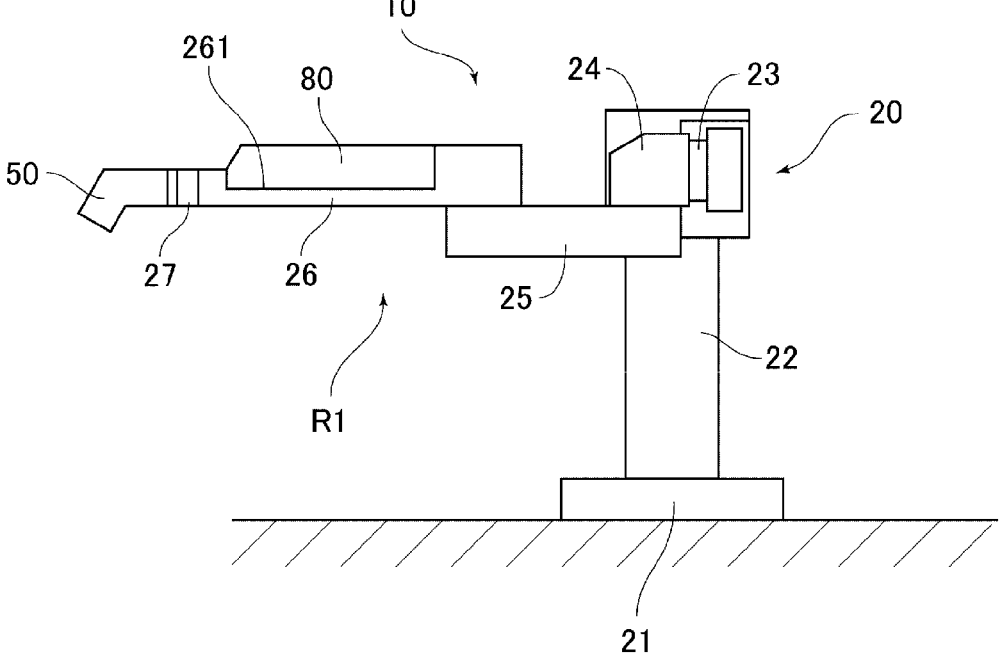
FIG. 1 is a schematic diagram showing the overall configuration of a painting robot according to an embodiment of the present invention.

FIG. 1 is a schematic diagram showing the overall configuration of a painting robot 10 according to the first embodiment of the present invention. As shown in FIG. 1, the main components of the painting robot 10 include a robot body 20 and a nozzle head unit 50.

1-2. Painting Device Body)

As shown in FIG. 1, the main components of the robot body 20 include a base 21, a leg portion 22, a rotating shaft portion 23, a rotating arm 24, a first revolving arm 25, a second revolving arm 26, a wrist portion 27 and a motor (not shown) for driving them. Additionally, although the portion from the rotating shaft portion 23 to the wrist portion 27 corresponds to the robot arm R1, other portions but the leg portion 22 may also correspond to the robot arm R1.

Among those, although the base 21 is a portion set at a setup location such as a floor face, the base 21 may also be travelable relative to the setup location. In addition, the leg portion 22 is a portion vertically arranged from the base 21 toward the upper side. Further, a joint portion may be provided between the leg portion 22 and the base 21 so that the leg portion 22 is revolvable relative to the base 21.

In addition, the rotating shaft portion 23 is provided at the upper end of the leg portion 22. The rotating arm 24 is mounted to the rotating shaft portion 23 in a rotatable state. In addition, the rotating arm 24 rotates through the drive of a motor (first motor) and an electric motor or a pneumatic motor may be used as the motor.

In addition, one end side of the first revolving arm 25 is mounted to the rotating arm 24 in a revolvable state. Further, a second motor (not shown) that rotates the first revolving arm 25 relative to the rotating shaft portion 23 may be accommodated in the housing of the rotating arm 24 or may be accommodated in the housing of the first revolving arm 25.

In addition, one end side of the second revolving arm 26 is mounted to the other end side of the first revolving arm 25 via a shaft portion in a swingable state. A third motor (not shown) that rotates the second revolving arm 26 relative to the first revolving arm 25 may be accommodated in the housing of the first revolving arm 25 or may be accommodated in the housing of the second revolving arm 26.

Here, the second revolving arm 26 is provided with a module mounting portion 261. The module mounting portion 261 is a portion for mounting the deaerating module 80 described later. Further, in the module mounting portion 261, although the deaerating module 80 can be mounted by mating fixation, the deaerating module 80 may also fixed by for example screws fixation, or by fixing a cover (not shown) covering the deaerating module 80 to the module mounting portion 261 with screws or the like and fixing the deaerating module 80 via that cover. Further, the module mounting portion 261 corresponds to an engagement portion for mounting the deaerating module 80.

The wrist portion 27 is mounted to the other end side of the second revolving arm 26. The wrist portion 27 is capable of rotational movement around a plurality of (e.g. three) shaft portions in different directions. Thereby, the direction of the nozzle head unit 50 can be accurately controlled. Further, the number of shaft portions may be any number as long as it is more than or equal to two.

Motors (the fourth to sixth motors; not shown) are provided for enabling the rotational movement of such wrist portion 27 around respective shaft portions. Further, although the fourth to sixth motors are accommodated in the housing of the second revolving arm 26, it may be accommodated in other locations.

In addition, the nozzle head unit 50 is mounted to the wrist portion 27 via a holder portion (not shown). That is to say, the nozzle head unit 50 is detachably provided to the wrist portion 27 via the holder portion.

Further, the painting robot 10 including the rotating shaft portion 23, the rotating arm 24, the first revolving arm 25, the second revolving arm 26, the wrist portion 27 and the first to sixth motors for driving them is a robot that can be driven in six axes. However, the painting robot 10 can be a robot driven in any number of axes, as long as it has four or more axes.

(1-3. Nozzle Head Unit)

Next, the nozzle head unit 50 will be described. The nozzle head unit 50 is mounted to the wrist portion 27 via a chuck portion (not shown).

Figure 2:
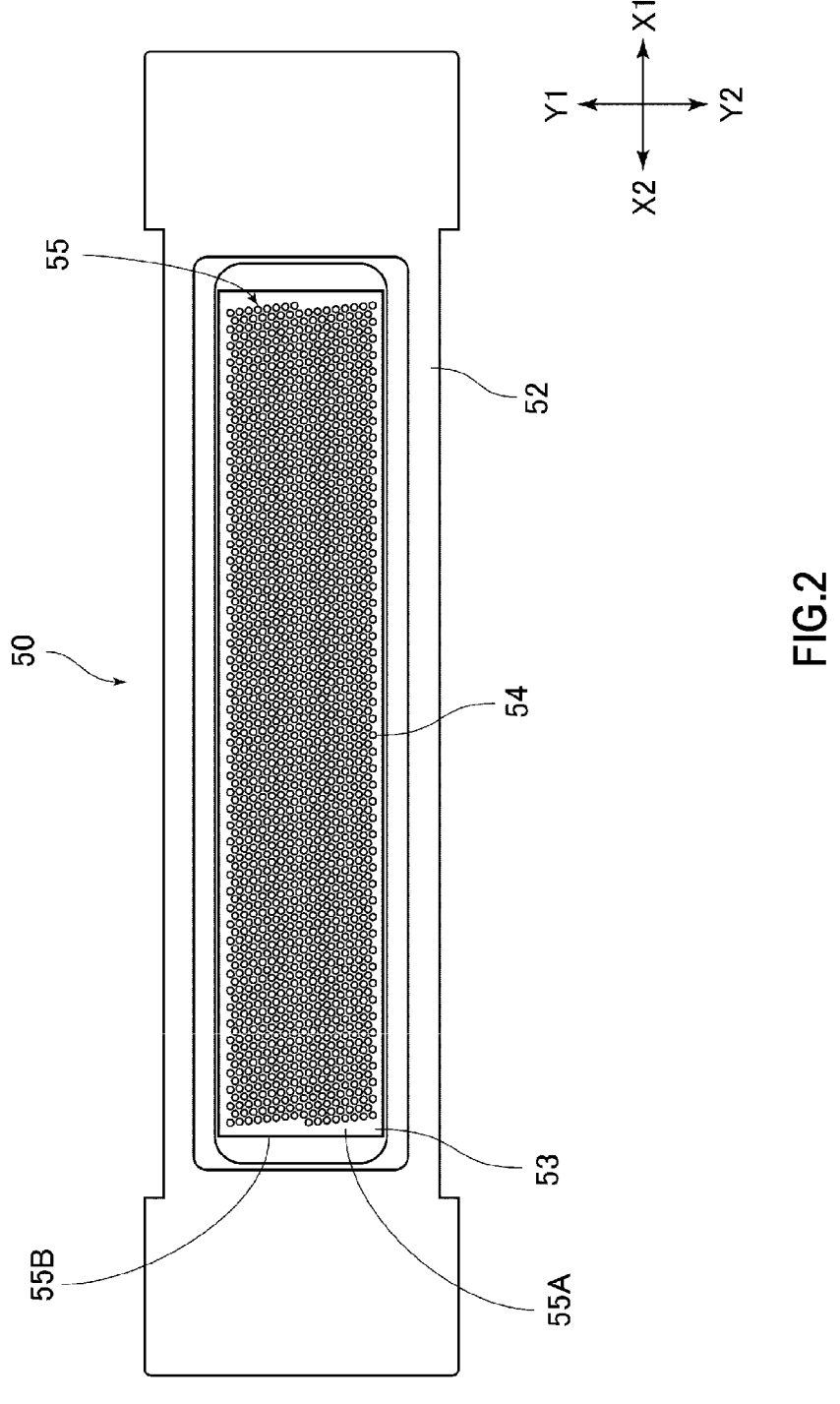
FIG. 2 shows a front view of the nozzle discharging surface of the painting robot, from which paint is discharged.

FIG. 2 shows a front view of the nozzle discharging surface 52 of the nozzle head unit 50, from which paint is discharged. As shown in FIG. 2, the nozzle discharging surface 52 is provided with a plurality of nozzle columns 55 in which the nozzles 54 are lining up in a direction inclined to the width direction of the nozzle head unit 50. In the present embodiment, a first nozzle column 55A located on one side (Y2 side) of the main scanning direction (Y direction) and a second nozzle column 55B (Y1 side) located on the other side of the main scanning direction are provided in such nozzle column 55.

Further, when discharging paint, the driving timings of the nozzles 54 are controlled so that droplets discharged from the nozzles 54 in the second nozzle column 55B impact between droplets discharged from adjacent nozzles 54 in the first nozzle column 55A. Thereby, the point density can be increased during painting.

Figure 3:
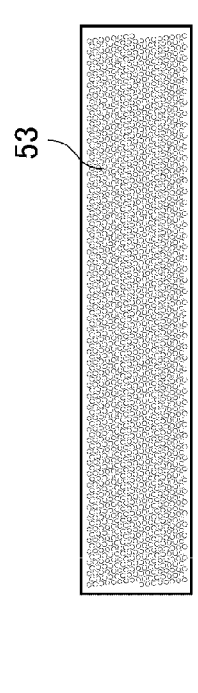
FIG. 3 shows a state in which a plurality of nozzle heads are arranged in a staggered shape in the painting robot shown in FIG. 1.
Figure 3:
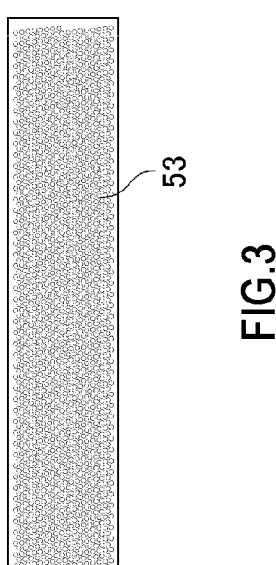
Figure 3:
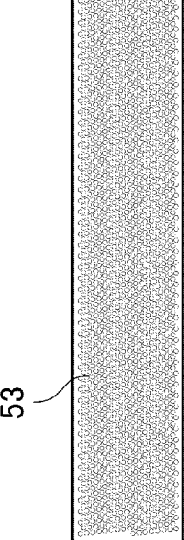

Meanwhile, as shown in FIG. 2, a single nozzle head 53 is present on the nozzle discharging surface 52. However, a head group consisting of a plurality of nozzle heads 53 may be present on the nozzle discharging surface 52. In this case, as shown in FIG. 3, although as an example, a configuration in which the plurality of nozzle head 53 are aligned and arranged in a staggered shape are illustrated, the arrangement of the nozzle head 53 in the head group may not be in a staggered shape.

Figure 4:
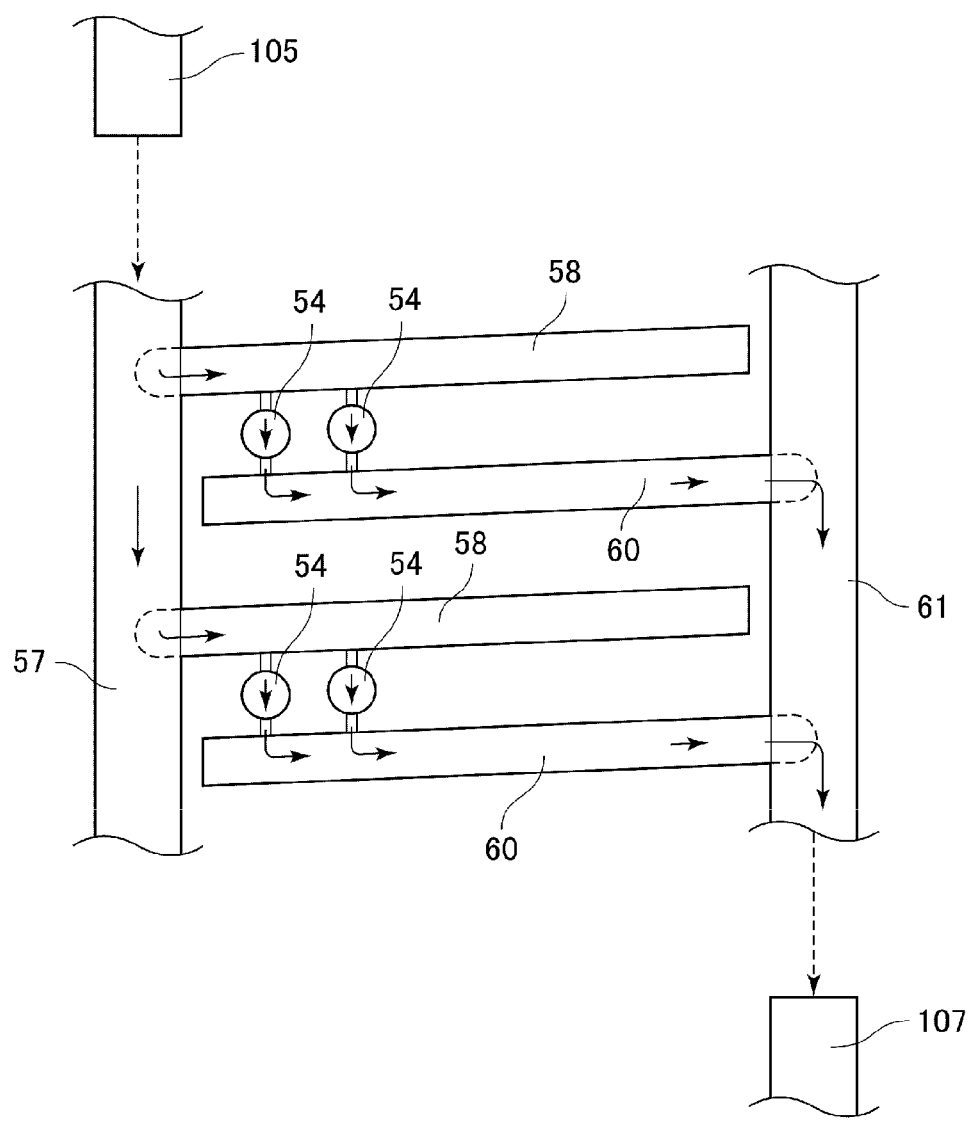
FIG. 4 shows the schematic configuration supplying paint to each nozzle in the painting robot shown in FIG. 1.
Figure 5:
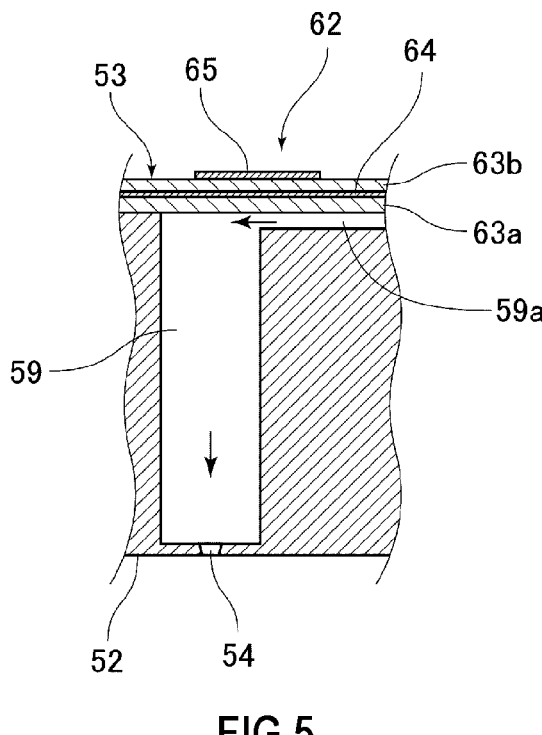
FIG. 5 is a sectional view showing a modified example of the configuration in the vicinity of the column-direction supply flow path, the nozzle pressurizing chamber and the column-direction exhaust flow path shown in FIG. 5.

FIG. 4 shows the schematic configuration supplying paint to each nozzle 54. FIG. 5 is a sectional view showing the configuration in the vicinity of the column-direction supply flow path 58, the nozzle pressurizing chamber 59 and the column-direction exhaust flow path 60. As shown in FIGS. 4 and 5, the nozzle head 53 includes a supply side large flow path 57, a column-direction supply flow path 58, a nozzle pressurizing chamber 59, a column-direction exhaust flow path 60, and an exhaust side large flow path 61. The supply side large flow path 57 is a flow path to which paint from the paint supply path 105 of the paint supply mechanism 100 described later is supplied. In addition, the column-direction supply flow path 58 is a flow path through which the paint in the supply side large flow path 57 is diverted.

In addition, the nozzle pressurizing chamber 59 is connected to the column-direction supply flow path 58 via the nozzle supply flow path 59a. Thereby, paint is supplied from the column-direction supply flow path 58 to the nozzle pressurizing chamber 59. The nozzle pressurizing chamber 59 is provided corresponding to the number of nozzles 54 and the paint therein can be discharged from the nozzles 54 using a driving element described later.

In addition, the nozzle pressurizing chamber 59 is connected to the column-direction exhaust flow path 60 via a nozzle exhaust flow path (not shown). Therefore, paint not discharged from the nozzles 54 is exhausted from the nozzle pressurizing chamber 59 to the column-direction exhaust flow path 60 via the nozzle exhaust flow path 59b. In addition, the column-direction exhaust flow path 60 is connected to the exhaust side large flow path 61. The exhaust side large flow path 61 is a flow path in which the paint exhausted from respective column-direction exhaust flow paths 60 converges. The exhaust side large flow path 61 is connected with the return flow path 107 of the paint supply mechanism 100 described later.

With this configuration, the paint supplied from the paint supply path 105 of the paint supply mechanism 100 described later is discharged from the nozzles 54 via the supply side large flow path 57, the column-direction supply flow path 58, the nozzle supply flow path 59a and the nozzle pressurizing chamber 59. In addition, paint not discharged from the nozzles 54 passes through the nozzle exhaust flow path 59b, the column-direction exhaust flow path 60 and the exhaust side large flow path 61 from the nozzle pressurizing chamber 59, and returns to the return flow path 107 of the paint supply mechanism 100 described later.

Further, in the configuration shown in FIG. 4, one column-direction exhaust flow path 60 is arranged corresponding to one column-direction supply flow path 58. However, a plurality of (e.g. two) column-direction exhaust flow paths 60 may also be arranged corresponding to one column-direction supply flow path 58. In addition, one column-direction exhaust flow path 60 may also be arranged corresponding to a plurality of column-direction supply flow paths 58.

In addition, as shown in FIG. 5, the piezoelectric substrate 62 is arranged on the top surface (the surface opposite to the nozzles 54) of the nozzle pressurizing chamber 59. The piezoelectric substrate 62 includes two piezoelectric ceramic layers 63a and 63b which are piezoelectric bodies and includes a common electrode 64 and an individual electrode 65. The piezoelectric ceramic layers 63a and 63b are members that can be expanded and contracted by applying a voltage from the outside. As such piezoelectric ceramic layers 63a and 63b, ceramic materials with ferroelectricity, such as lead zirconate titanate (PZT) based, NaNbO3 based, BaTiO3 based, (BiNa) NbO3 based and BiNaNb5O15 based materials, can be used.

In addition, as shown in FIG. 5, the common electrode 64 is arranged between the piezoelectric ceramic layer 63a and the piezoelectric ceramic layer 63b. In addition, a surface electrode (not shown) for the common electrode is formed on the upper surface of the piezoelectric substrate 62. The common electrode 64 and the surface electrode for the common electrode are electrically connected via a through conductor (not shown) present in the piezoelectric ceramic layer 63a. In addition, the individual electrodes 65 are respectively provided at positions facing the above nozzle pressurizing chambers 59. Furthermore, a portion of the piezoelectric ceramic layer 63a sandwiched between the common electrode 64 and the individual electrode 65 is polarized in the thickness direction. Therefore, in response to applying a voltage to the individual electrode 65, the piezoelectric ceramic layer 63*a* is strained due to the piezo-electric effect. For this reason, in response to applying a prescribed driving signal to the individual electrode 65, the piezoelectric ceramic layer 63*b* varies relatively so as to reduce the volume of the nozzle pressurizing chamber 59, thereby discharging the paint.

Figure 6:
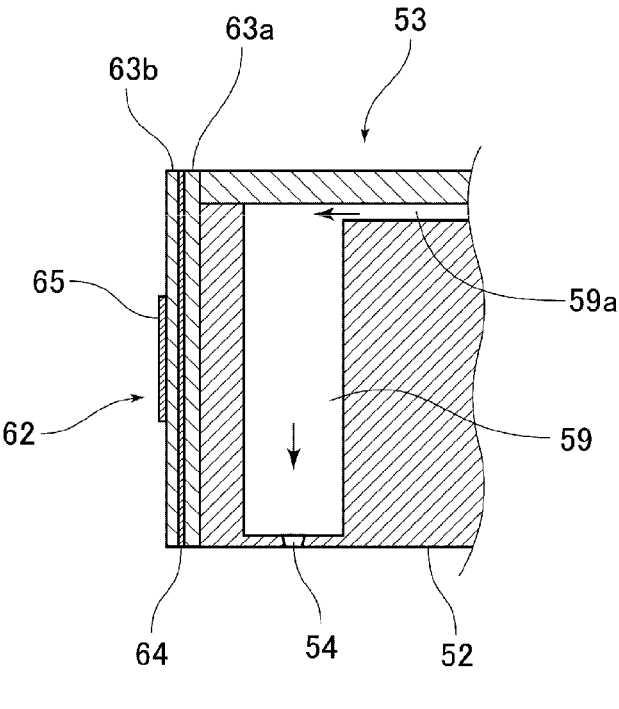
FIG. 6 is a sectional view showing a modified example of the configuration in the vicinity of the column-direction supply flow path, the nozzle pressurizing chamber and the column-direction exhaust flow path shown in FIG. 6.

Further, although in the configuration shown in FIG. 5, the common electrode 64 is arranged on the top surface of the nozzle pressurizing chamber 59, it is not limited to this configuration. For example, as shown in FIG. 6, the common electrode 64 may be arranged on the side surface of the nozzle pressurizing chamber 59, and any other configuration may be adopted as long as the paint can be sufficiently discharged from the nozzles 54.

(1-4. Other Configurations of the Nozzle Head Unit)

Figure 7:
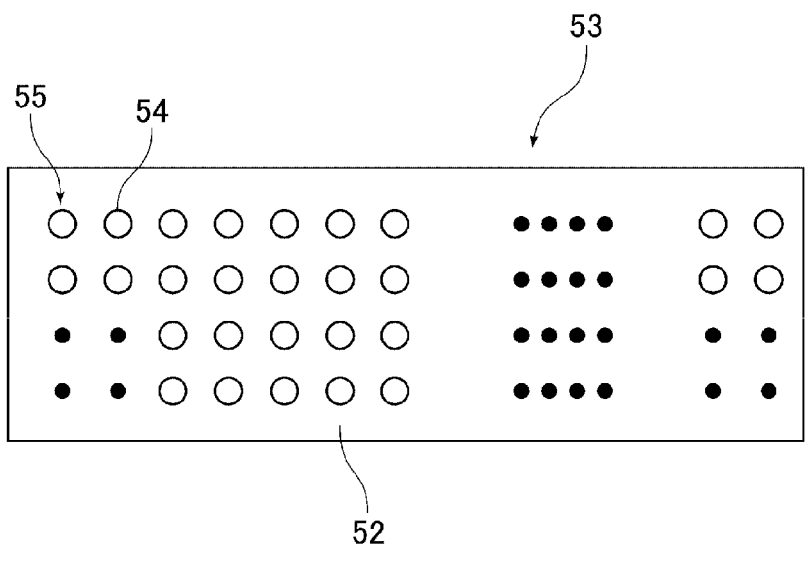
FIG. 7 is a plan view showing the configuration of a nozzle discharging surface of a further nozzle head unit different from the nozzle head unit shown in FIG. 2.

Next, other configurations of the nozzle head unit 50 will be described. FIG. 7 is a plan view showing the configuration of a nozzle discharging surface 52 of a further nozzle head unit 50. As shown in FIG. 7, a nozzle column 55 may be constituted by arranging a plurality of nozzles 54 in the short direction (width direction; Y direction) of the nozzle head 53. Further, although in the configuration shown in FIG. 7, a nozzle column 55 is constituted by arranging a plurality of nozzles 54 in the short direction (width direction; the main scanning direction) of the nozzle head 53, a configuration in which only one (single) nozzle 54 is arranged in the short direction (width direction; the main scanning direction) of the nozzle head 53 may be adopted. That is to say, the nozzle column 55 may be constituted by one nozzle 54.

In addition, when painting a vehicle using the nozzle head 53 shown in FIG. 7, painting may be performed in a state in which the long direction of the nozzle head 53 is slightly inclined to the main scanning direction of the nozzle head 53. For example, in the configuration of the nozzle head 53 shown in FIG. 2, the long direction of the nozzle head 53 may be inclined to the main scanning direction of the nozzle head 53 by an angle α if the nozzle column 55 is inclined to the main scanning direction by an angle α. With this inclination, the same painting as the nozzle head 53 shown in FIG. 2 can be achieved by only adjusting the discharging timing of the paint from the nozzles 54.

(1-5. Deaerating Module)

Figure 8:
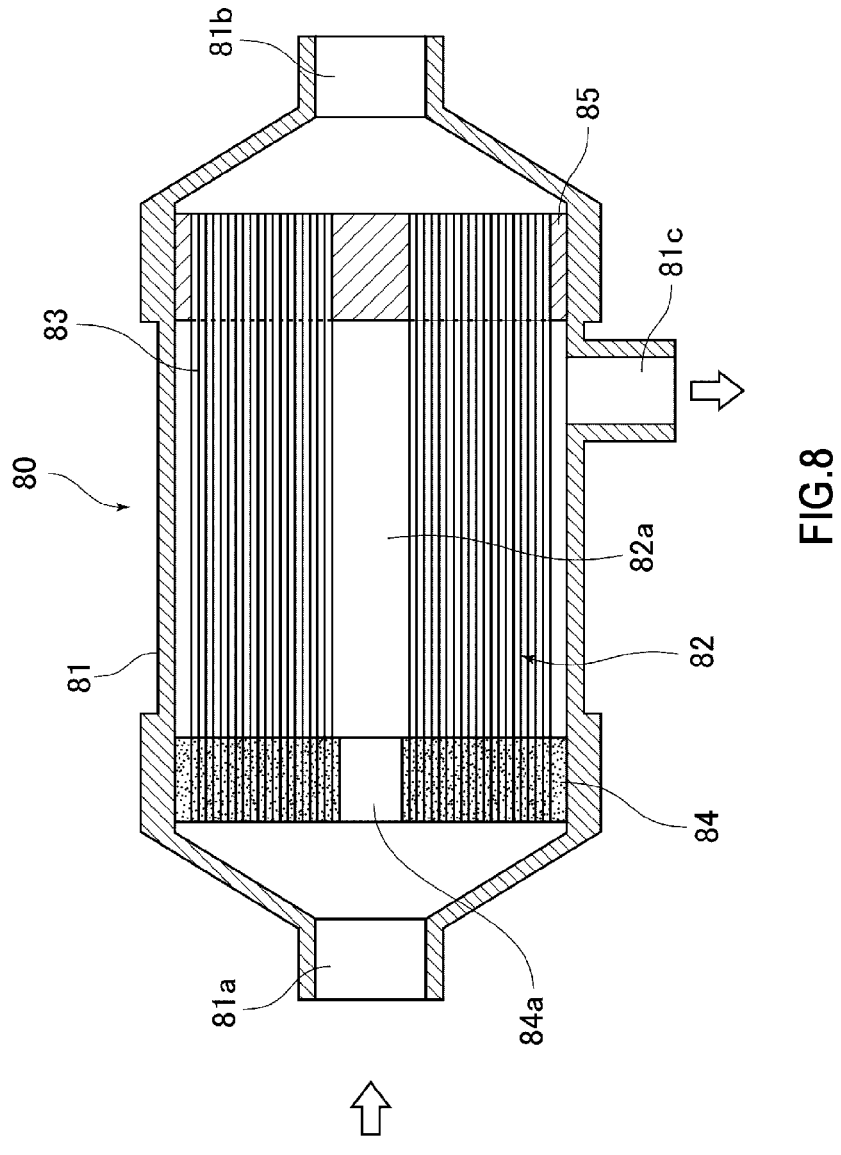
FIG. 8 is a sectional view showing the schematic configuration of a deaerating module included in the painting robot shown in FIG. 1.

Next, the configuration of the deaerating module 80 will be described. FIG. 8 is a sectional view showing the schematic configuration of the deaerating module 80. The deaerating module 80 is disposed on the downstream side of the paint supply path compared to the removal filter 90 described later and is a member for removing dissolved gas dissolved (deaeration) in the paint. The deaerating module 80 corresponds to a second filter. As shown in FIG. 8, the deaerating module 80 includes a case 81, a hollow fiber membrane bundle 82, an inflow-side sealing member 84 and a vent-side sealing member 85.

Among those, the case 81 is a cylindrical member accommodating the hollow fiber membrane bundle 82, the inflow-side sealing member 84 and the vent-side sealing member 85. A paint supply port 81*a* is provided on one end side of the case 81 along the center line not shown and the paint supply port 81*a* is connected to the upstream side of the paint supply path 105. In addition, a suction port 81*b* is provided on the other end side of the case 81 along the center line and the suction port 81*b* is connected to a vacuum pump 110 described later via a suction pipeline 109. Therefore, the pressure inside the case 81 is reduced and the dissolved gas dissolved in the paint is exhausted from the suction port 81*b* due to the reduced pressure (deaeration).

In addition, a paint exhaust port 81*c* is provided on the side surface of the case 81 and the paint exhaust port 81*c* is connected to the downstream side of the paint supply path 105. Therefore, the paint flowed into the case 81 flows to the downstream side from the paint exhaust port 81*c*.

The hollow fiber membrane bundle 82 is a member in which a plurality of hollow fiber membranes 83 are bundled into for example a circular cylindrical shape. One end side (the end of the paint inflow-side) of the hollow fiber membrane bundle 82 is fixed to the inflow-side sealing member 84, and the other end side (the end of the side from where the gas is exhausted) thereof is fixed to the vent-side sealing member 85. The hollow fiber membranes 83 constituting the hollow fiber membrane bundle 82 are hollow fiber-like membranes which are gas-permeable but are not permeable to liquids with molecules larger than gases. Further, materials of the hollow fiber membranes 83 include for example polyolefin resins such as polypropylene and poly (4-methylpentene-1), silicone resins such as polydimethylsiloxane and copolymers thereof, and fluororesins such as PTFE and vinylidene fluoride. However, the materials of the hollow fiber membranes 83 are not limited to these materials and other materials may be used.

In addition, as the membrane shape of the hollow fiber membranes 83, for example, a porous membrane, a microporous membrane, a non-porous membrane without porousness, and the like may be mentioned, but the membrane shape thereof is not limited to these. Further, as the membrane morphology of the hollow fiber membrane 83, for example, symmetric membranes (homogeneous membranes) having a chemically or physically homogeneous structure of the whole membrane and asymmetric membranes (heterogeneous membranes) in which the chemical or physical structures of the membrane are different depending on the portions of the membrane may be included, but the membrane morphology is not limited to these. Further, asymmetric membrane (heterogeneous membrane) is a membrane with non-porous dense layer and porous substance. In this case, the dense layer may be formed anywhere in the membrane such as the surface layer portion of the membrane or inside the porous membrane. Heterogeneous membranes also include composite membranes with different chemical structures and membranes with multi-layer structures, such as three-layer structures. In particular, a heterogeneous membrane using a poly (4-methylpentene-1) resin is particularly preferred for deaeration of liquids other than water, such as ink, since it has a dense layer that blocks liquids. In addition, for hollow fibers for the external perfusion type, dense layers are preferably formed on the outer surface of the hollow fibers.

As the hollow fiber membrane bundle 82, a hollow fiber membrane sheet formed into a sheet shape by arranging a plurality of hollow fiber membranes 83 may be used and the hollow fiber membrane sheet is formed into a circular cylindrical shape for example. Moreover, the hollow fiber membrane bundle 82 as shown in FIG. 8 is formed by arranging a plurality of circular cylindrical hollow fiber membrane sheets with different diameters inside the case 81. A central supply portion 82*a* to which paint is supplied is provided on the center side of the hollow fiber membrane bundle 82.

In addition, the inflow-side sealing member 84 is formed using resin for example. A supply hole 84*a* for supplying paint to the central supply portion 82*a* is provided in the center of the inflow-side sealing member 84 in the radial direction thereof. Further, the resin used to form the inflow-side sealing member 84 can be any resin, as long as it can prevent paint from flowing into anywhere other than the supply hole 84a.

Further, the vent-side sealing member 85 is also formed in the same way as the inflow-side sealing member 84, for example using resin. However, unlike the inflow-side sealing member 84, the vent-side sealing member 85 does not have a hole formed in the center in the radial direction thereof. Therefore, it is difficult for the paint to pass through the vent-side sealing member 85 and flow out to the suction port 81b side.

With the deaerating module 80 having such a configuration, the paint supplied to the central supply portion 82a passes among the hollow fiber membranes 83 constituting the hollow fiber membrane bundle 82 and flows to the outside of the case 81 in the radial direction thereof. At this time, by operating the vacuum pump 110 to reduce the pressure inside the hollow fiber membranes 83 through the suction port 81b, when paint passes among the hollow fiber membranes 83, the gas dissolved in the paint is introduced into the inside of the hollow fiber membrane bundle 82, thereby removing (deaerating) the dissolved gas from the paint. The paint deaerated in this manner is supplied from the paint exhaust port 81c to the downstream side of the paint supply path 105.

Further, although the deaerating module 80 is mounted to the module mounting portion 261 of the second revolving arm 26 described above, the deaerating module 80 may also be mounted to the module mounting portion 261 via a casing that further covers the case 81. Further,
(1-6. Removal Filter)

Next, the removal filter 90 will be described. The removal filter 90 is provided on the upstream side of the paint supply path 105 compared to the deaerating module 80 described above. The removal filter 90 removes foreign matter included in the paint flowing through the paint supply path 105. Further, the removal filter 90 corresponds to the first filter.

Here, both water-based paint and solvent paint generally contain a pigment component in the paint, and the removal filter 90 is required to maintain the normal and continuous operation of the nozzle head 53 by reliably removing coarse foreign matter and pigment aggregates from the paint containing such pigments. In addition, for solvent paints, the paints usually contain gelatinous foreign matter, and the paints usually contain bubbles with sizes equal to or larger than the specified size. Therefore, the removal filter 90 is also required to remove such gelatinous foreign matter and bubbles.

The removal filter 90 as described above for removing coarse foreign matter, pigment condensate, gelatinous foreign matter and air bubbles may be appropriately selected from the following. Specifically, the removal filter 90 may use a mesh-like body such as a metal mesh or a resin mesh, a porous body or a metal plate perforated with microscopic through holes. As the mesh-like body, a metal mesh filter or metal fiber, a felt made of metal (such as SUS) wire, a compression-sintered metal sintered filter, an electroformed metal filter, an electron beam processed metal filter, a laser beam processed metal filter, and the like may be used.

Further, the removal filter 90 has high-precision hole diameters so as to reliably remove foreign matter with a particle size equal to or larger than a certain overall particle size. In addition, in order to prevent foreign matter in the paint from reaching the nozzles 54, for example, when the openings of the nozzles 54 are circular, the hole diameter is preferably smaller than the diameter of the openings of the nozzles 54.

Further, the above-described removal filter 90 is configured so that the passage of the paint through the removal filter 90 is not hindered by for example fixing the peripheral portion of the above-described removal filter 90 using a fixing device (for example a fixing housing) not shown.
(1-7. Paint Supply Mechanism)

Figure 9:
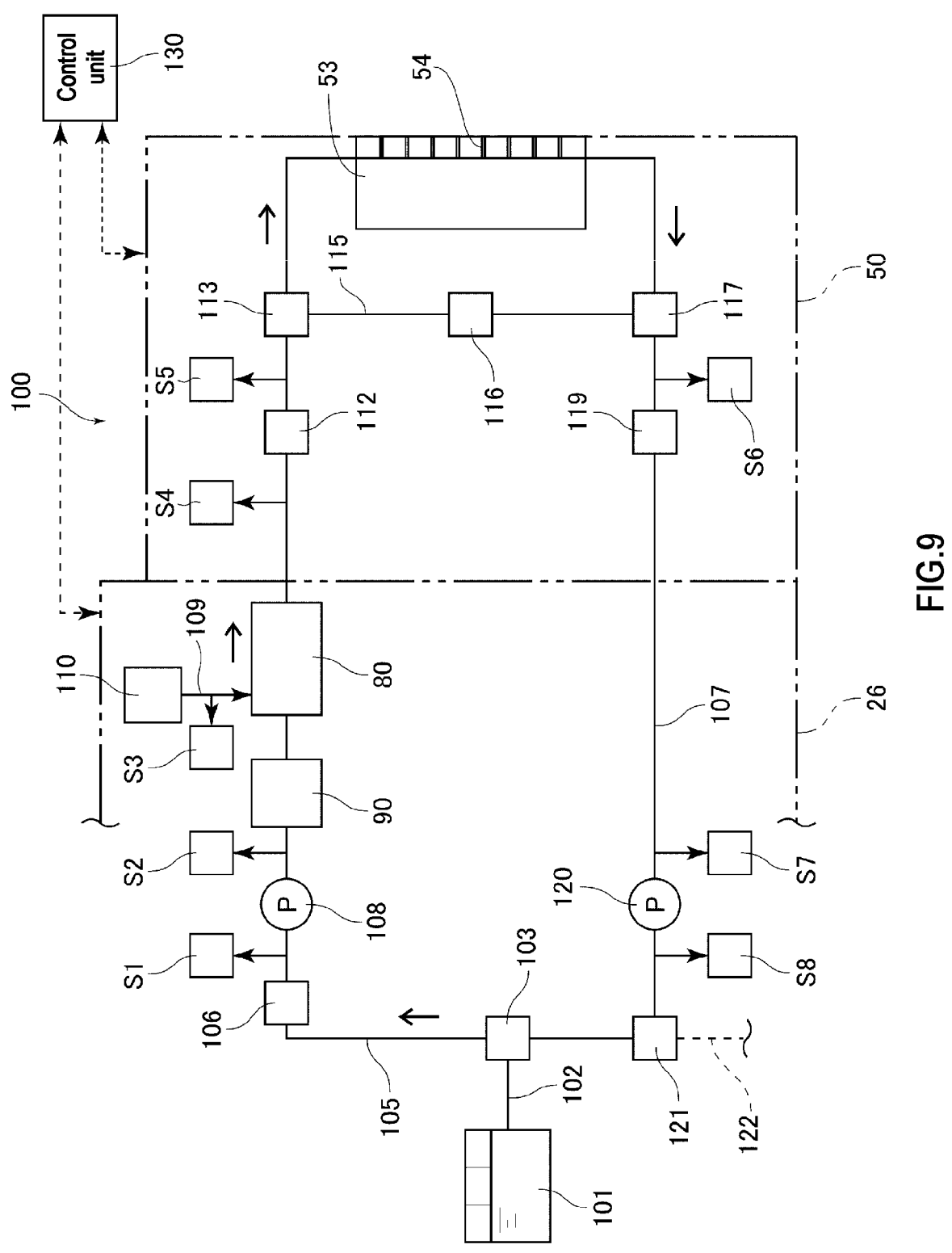
FIG. 9 shows the schematic configuration of a paint supply mechanism included in the painting robot shown in FIG. 1.

Next, the paint supply mechanism 100 having the above-described deaerating module 80 and the removal filter 90 will be described. FIG. 9 is a diagram showing the schematic configuration of the paint supply mechanism 100. The paint supply mechanism 100 includes a paint storage portion 101, a connection path 102, a three-way valve 103, a paint supply path 105, a sub-tank 106, a return flow path 107, a supply pump 108 and pressure sensors S1 to S8.

The paint storage portion 101 is a portion storing paint, for example a tank for storing paint, a cartridge storing paint and the like fall under the category. Further, although only one paint storage portion 101 is shown in FIG. 9, a configuration may also be adopted in which a number of paint storage portions 101 are provided according to the type of the paint (e.g. color of the paint) and these paint storage portions are connected to a common flow path via switching valves.

In addition, the paint storage portion 101 and the three-way valve 103 are connected via the connection path 102, and the three-way valve 103 is connected to the above-mentioned connection path 102, the paint supply path 105 and the return flow path 107. Moreover, during painting consuming significant amount of paint, the operation of the three-way valve 103 is switched so that the paint flows from the paint storage portion 101 to the paint supply path 105 side via the connection path 102. On the other hand, when paint is not discharged from the nozzle head 53, the three-way valve 103 is switched so that the paint returned to the return flow path 107 without being discharged by the nozzle head 53 flows to the paint supply path 105. In this manner, even if paint is not discharged from the nozzle head 53, settling of components in paint can be prevented by circulating the paint. In addition, depending on the type of paint, it may be possible to reduce the viscosity of paint when the paint flows.

In addition, the paint supply path 105 is a flow path for supplying paint from the three-way valve 103 to the nozzle head 53 and is connected to the above-mentioned supply side large flow path 57.

Further the sub-tank 106 is a portion provided as a buffer for smoothly circulating paint in the paint supply mechanism 100. That is to say, paint supplied from the paint storage portion 101 cannot be returned to the three-way valve 103 side again after passing through the three-way valve 103. Therefore, if more paint than the amount of paint discharged from the nozzle head 53 is supplied by driving of the supply pump 108 described later, there is a risk that this may cause defects such as circulation stop of paint. Therefore, the sub-tank 106 as a buffer for storing paint is arranged in the intermediate portion of the paint supply path 105. Thereby, even if the storage amount of paint is changed in the sub-tank 106, the paint can be discharged from the nozzle head 53 without causing any obstruction to the circulation of paint in the circulation path from the paint supply path 105 via the nozzle head 53 through the return flow path 107.

In addition, the return flow path 107 is connected with the exhaust side large flow path 61 of the nozzle head 53 and is a flow path for returning the paint not discharged from the nozzle head 53 to the three-way valve 103.

In addition, the supply pump 108 is connected to the intermediate portion of the paint supply path 105 and is a device configured to apply a positive pressure to the paint flowing through the paint supply path 105. Here, in the paint supply path 105, the pressure sensor S1 is arranged on the upstream side of the supply pump 108. At the same time, in the paint supply path 105, the pressure sensor S2 is arranged on the downstream side of the supply pump 108 and on the upstream side of the removal filter 90. The pressure sensor S1 measures the supply pressure of the paint to the supply pump 108 and sends the measurement result to a control unit 130. In addition, the pressure sensor S2 measures the pressure of the paint discharged from the supply pump 108 and sends the measurement result to the control unit 130.

In this manner, by measuring the pressures of paint on the upstream side and the downstream side of the supply pump 108 using the pressure sensor S1 and the pressure sensor S2, the application of positive pressure of paint to the removal filter 90 side through the operation of the supply pump 108 can be accurately adjusted. Therefore, by applying pressure equal to or larger than a prescribed pressure to the removal filter 90, damage to the removal filter 90 or foreign matter passing through the removal filter 90 can be prevented.

In addition, the vacuum pump 110 is connected to the deaerating module 80 via the suction pipeline 109. As described above, the vacuum pump 110 is a device configured to reduce the pressure inside the case 81 of the deaerating module 80 (inside the hollow fiber membranes 83). By such pressure reduction, dissolved gas dissolved in the paint supplied to the inside of the case 81 is removed (deaerated). Further, the suction pipeline 109 is connected to the above-mentioned suction port 81b of the case 81 in addition to the vacuum pump 110.

In addition, the pressure sensor S3 measures the pressure of the suction pipeline 109 between the vacuum pump 110 and the deaerating module 80.

Further, in the paint supply path 105, the pressure sensor S4 is arranged on the downstream side of the deaerating module 80 and on the upstream side of the paint regulator 112, and measures the pressure of this part of the paint supply path 105, and the control unit 130 feedback controls the operation of the supply pump 108 based on the measurement result of the pressure. That is to say, depending on the clogging situation of the removal filter 90 and the deaerating module 80, even if the supply pump 108 operates, the pressure drop varies on the downstream side of the removal filter 90 and the deaerating module 80. Therefore, based on the pressure difference between the pressure sensor S2 and the pressure sensor S4, the control unit 130 determines how much pressure is being applied to the removal filter 90 and the deaerating module 80. Thereby, the supply pump 108 may be controlled to apply an appropriate pressure to the removal filter 90 and the deaerating module 80. In addition, depending on the clogging conditions of the removal filter 90 and the deaerating module 80, the control unit 130 announces the timing of replacement of the removal filter 90 and the deaerating module 80.

Further, although the paint supply mechanism 100 is preferably provided with the above-mentioned pressure sensor S4, a configuration in which the pressure sensor S4 is omitted may also be adopted. In addition, the pressure sensor S4 may be provided on the nozzle head unit 50 side but may also be provided on the second revolving arm 26 side (the robot arm R1 side).

In addition, in the paint supply path 105, the paint regulator 112 is arranged on the downstream side of the deaerating module 80. The paint regulator 112 slows down pulsations in the supply pump 108 and supplies paint at a constant pressure. The paint regulator 112 has an on-off valve that can adjust the opening degree according to the control air pressure or an electrical signal, and controls the pressure and discharge amount of the paint flowing through the paint supply path 105 by adjusting the valve opening degree of the on-off valve. Further, as the paint regulator 112, for example a paint regulator including an air operated on-off valve may be used, but a paint regulator including an electric or electromagnetic on-off valve may also be used. Further, as the on-off valve, for example a proportional control valve may be used, but a servo valve may also be used.

Further, the pressure sensor S5 measures the pressure of the paint supply path 105 on the downstream side of the paint regulator 112 and on the upstream side of the bypass flow path 115.

In addition, the paint supply path 105 is connected to the three-way valve 113 on the downstream side of the paint regulator 112. The three-way valve 113 is connected to the intermediate portion of the paint supply path 105 and also to the bypass flow path 115. Therefore, during painting, the upstream side and the downstream side of the three-way valve 113 of the paint supply path 105 are in an open state and the paint is supplied to the nozzle head 53. On the other hand, when painting is not performed, it is switched so that paint flows from the paint supply path 105 to the bypass flow path 115 but the paint is not supplied to the downstream side (nozzle head 53 side) of the paint supply path 105.

In addition, the bypass flow path 115 is a flow path connecting the paint supply path 105 and the return flow path 107. That is to say, the bypass flow path 115 is provided in parallel with the nozzle head 53 and when the paint is not discharged from the nozzle head 53, the paint flows to the bypass flow path 115 by switching the operation of the above-mentioned three-way valve 113.

An on-off valve 116 is provided in the intermediate portion of the bypass flow path 115. By operating the on-off valve 116 to open, paint can flow through the bypass flow path 115.

Further, a three-way valve 117 is connected to the downstream side of the bypass flow path 115 compared to the on-off valve 116, and the three-way valve 117 is further connected to the upstream side (i.e., the nozzle head 53 side of the return flow path 107) and the downstream side (i.e., the suction pump side of the return flow path 107). Therefore, during painting, the upstream side and the downstream side of the three-way valve 117 of the return flow path 107 are in an open state and the paint not discharged from the nozzle head 53 flows to the downstream side of the return flow path 107. On the other hand, when painting is not performed, the three-way valve 117 is switched so that paint flowing through the bypass flow path 115 flows to the downstream side (suction pump side) of the return flow path 107.

In addition, in the return flow path 107, a paint regulator 119 is arranged on the downstream side of the above-mentioned three-way valve 117. The paint regulator 119 slows down pulsations in the suction pump 120 and sucks paint at a constant pressure. Thereby, when the negative pressure increases due to the pulsation in the suction pump 120, air is introduced from the nozzles 54 so that air can be prevented from being mixed into paint. Further, like the paint regulator 112 described above, the paint regulator 119 has an on-off valve that can adjust the opening degree according to the control air pressure or an electrical signal, and controls the negative pressure applied to the paint flowing through the return flow path 107 by adjusting the valve opening degree of the on-off valve. Further, as the paint regulator 119, for example a paint regulator including an air operated on-off valve may be used, but a paint regulator including an electric or electromagnetic on-off valve may also be used. Further, as the on-off valve, for example a proportional control valve may be used, but a servo valve may also be used.

Further, the pressure sensor S6 measures the pressure of the return flow path 107 on the upstream side of the paint regulator 119 and on the downstream side of the three-way valve 117.

In addition, in the return flow path 107, the suction pump 120 is connected to the downstream side of the paint regulator 119 and applies a negative pressure to the paint flowing through the return flow path 107. Further, in the return flow path 107, the pressure sensor S7 is arranged on the upstream side of the suction pump 120. At the same time, in the return flow path 107, the pressure sensor S8 is arranged on the downstream side of the suction pump 120 and on the upstream side of the switching valve 121 described later. The pressure sensor S7 measures the pressure (negative pressure) of the paint fed into the suction pump 120 and sends the measurement result to the control unit 130. In addition, the pressure sensor S8 measures the pressure of the paint discharged from the suction pump 120 and sends the measurement result to the control unit 130.

In addition, in the return flow path 107, the switching valve 121 is arranged on the downstream side of the suction pump 120. The switching valve 121 is also a three-way valve and is connected to the exhaust path 122 in addition to the upstream side and the downstream side of the return flow path 107. In the normal state of the switching valve 121, paint flows on the upstream side and the downstream side of the return flow path 107. However, for example when the cleaning liquid flows from the paint supply path 105 to the return flow path 107 via the nozzle head 53 or the bypass flow path 115, the operation of the switching valve 121 is switched and the above-mentioned cleaning liquid (waste liquid) is exhausted via the exhaust path 122.

Further, the return flow path 107 is connected to the three-way valve 103 on the downstream side of the switching valve 121.

In addition, the painting robot 10 is provided with a control unit 130. The control unit 130 controls the operation of various driving portions of the paint supply mechanism 100. Further, detection signals from various sensors of the paint supply mechanism 100 are input to the control unit 130 and the operations of the driving portions corresponding to the sensors are controlled. Specifically, as shown in FIG. 9, measurement results of the pressures measured by the pressure sensors S1 to S8 are sent to the control unit 130. In addition, the control unit 130 controls operations of the three-way valves 103, 113, and 117, the supply pump 108, the vacuum pump 110, the paint regulators 112 and 119, the on-off valve 116, the suction pump 120 and the switching valve 121. Further, also the control unit 130 may control the operations of driving portions of the robot arm R1, the operations of driving portions of the robot arm R1 may also controlled by another control device.

Further, the control unit 130 includes a CPU, a memory (ROM, RAM, non-volatile memory, etc.), and other elements. In addition, programs and data for executing the desired control is stored in the memory.

2. Functions

Next, the functions of the painting robot 10 having the above-mentioned configuration will be described below.
(2-1. The Case where the Vehicle is Painted)

When painting vehicles (not shown), the portions of the robot arm R1 are operated and the nozzle head 53 is also operated. At this time, the three-way valve 103 is switched so that paint is supplied from the connection path 102 to the paint supply path 105. Thereby, the paint stored in the paint storage portion 101 flows to the sub-tank 106 via the connection path 102 and the three-way valve 103 and further flows to the removal filter 90.

Here, the control unit 130 controls the operation of the supply pump 108 based on the measurement results of the pressure sensors S1 and S2. Thereby, the paint is supplied to the removal filter 90 at an appropriate pressure so that a pressure equal to or larger than a prescribed pressure is applied to the removal filter 90, damage to the removal filter 90 or foreign matter passing through the removal filter 90 is thus prevented. In addition, by applying a pressure equal to or lower than the predetermined pressure to the removal filter 90, the flow rate of the paint flowing through the paint supply path 105 is prevented from slowing down and the viscosity of the paint flowing through the paint supply path 105 is prevented from increasing.

In addition, the paint passing through the above-mentioned removal filter 90 is supplied to the deaerating module 80. Here, the vacuum pump 110 operates under the control of the control unit 130 and reduces the pressure inside the hollow fiber membranes 83. Thus, when paint passes among the hollow fiber membranes 83 inside the case 81, the dissolved gas is removed (separated) from the paint. Then the paint removed of the dissolved gas is supplied to the downstream side of the paint supply path 105 (the paint regulator 112 side). Further, the control unit 130 controls the operation of the vacuum pump 110 based on the measurement result of the paint pressure by the pressure sensor S3.

In addition, in the paint regulator 112, the supply pressure and supply amount of the paint supplied to the nozzle head 53 are adjusted to be appropriate while the pulsation of the paint supply by the supply pump 108 is alleviated. Further, the control unit 130 controls the operation of the paint regulator 112 based on the measurement result of the paint pressure by the pressure sensor S5.

Here, when supplying paint to the nozzle head 53, the control unit 130 switches the three-way valve 113 so as to supply the paint to the nozzle head 53 and supplies the paint to the nozzle head 53, thereby discharging the paint from the nozzles 54. Further, when paint is discharged from the nozzles 54, it is also possible to detect whether the paint is properly discharged from the nozzles 54 by measuring the pressure of the paint flowing through the paint supply path 105 by the pressure sensor S5.

Further, although the on-off valve 116 is in a closed state when the paint is discharged from the nozzles 54 as described above, the three-way valve 117 can also cause the paint to flow to the suction pump 120 side.

On the other hand, when paint is supplied to the nozzle head 53 side but no paint is discharged from the nozzles 54, the paint passes through the circulation path C1 (refer to FIG. 10) in the nozzle head 53, for example, the supply side large flow path 57, the column-direction supply flow path 58, the column-direction exhaust flow path 60 and the exhaust side large flow path 61 in the nozzle head 53, and then flows to the return flow path 107. At this time, the control unit 130 operates the suction pump 120 and controls the operation of the paint regulator 119. Specifically, based on the pressure measurement results by the pressure sensors S7 and S8, the control unit 130 controls the operation of the suction pump 120 such that an appropriate negative pressure is applied to the return flow path 107.

At this time, the control unit 130 controls the operation of the paint regulator 119. In the paint regulator 119, the negative pressure applied to the nozzle head 53 is adjusted to be appropriate while the pulsation of the paint supply by the suction pump 120 is alleviated. At this time, the control unit 130 controls the operation of the paint regulator 119 based on the measurement result of the paint pressure by the pressure sensor S6.

Further, the control unit 130 switches the three-way valve 103 so that paint flows from the return flow path 107 to the paint supply path 105 to store excess paint in the sub-tank 106.

(2-2. The Case where the Vehicle is No Painted)

Next, the action of the painting robot 10 in the case where paint is not supplied to the nozzle head 53 side and the vehicle is not painted will be described.

In a standby state in which the vehicle is no painted, when the paint inside the paint supply path 105 is in a non-flowing state, for instance, certain components in the paint settles, or viscosity increases. Therefore, even in the standby state, it is necessary for the paint inside the paint supply path 105 to flow continuously. Therefore, as in the case of painting, the control unit 130 operates the supply pump 108 and the paint regulator 112, and further supplies paint to the three-way valve 113 side while operating the vacuum pump 110 to deaerate the paint.

Figure 10:
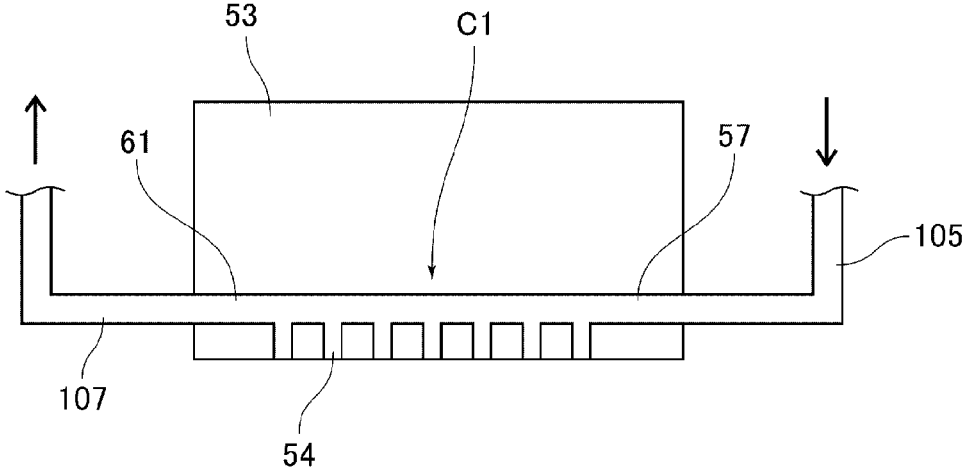
FIG. 10 shows the schematic configuration of a circulation path in the nozzle head of the painting robot shown in FIG. 1.

However, although paint is not discharged from the nozzles 54, when paint is sucked by the suction pump 120 through the circulation path C1 on the nozzle head 53 side shown in FIG. 10, air may be introduced from the nozzles 54. In this case, air enters the inside of the nozzles 54, resulting in discharge failure of paint.

Therefore, in the present embodiment, in the above-mentioned standby state, the control unit 130 switches the three-way valve 113 so that the paint flows to the bypass flow path 115 and the paint is no longer supplied to the nozzle head 53. At the same time, the control unit 130 opens the on-off valve 116. Further, the control unit 130 switches the three-way valve 117 so that paint flows from the bypass flow path 115 to the suction pump 120 of the return flow path 107.

In addition to the above conditions, the control unit 130 operates the suction pump 120 and controls the operation of the paint regulator 119 as in the painting described above. Then paint flows from the bypass flow path 115 via the three-way valve 117 and flows through the return flow passage 107 toward the three-way valve 103. In addition, the control unit 130 switches the three-way valve 103 so that paint flows from the return flow path 107 to the paint supply path 105. Therefore, excess paint is stored in the sub-tank 106 and further by the operation of the supply pump 108 and the paint regulator 112 described above, paint again flows through the paint supply path 105 toward the three-way valve 113.

Therefore, paint becomes to circulate in the paint supply path 105, the bypass flow path 115 and the return flow path 107, and passes through the removal filter 90 and the deaerating module 80 each time of circulation. Therefore, foreign matter is further removed from paint and deaeration of paint is further promoted.

3. Effects

In the ink-jet type painting robot 10 having the above configuration, the painting robot configured to discharge paint toward the painting object from the nozzles 54 to perform painting includes: a nozzle head 53 including a plurality of nozzles 54 and discharging paint from the nozzles 54 by driving of a piezoelectric substrate 62; a paint supply path 105 connected to the paint supply side of the nozzle head 53; a return flow path 107 connected to the paint exhaust side of the nozzle head 53 and configured to recover the paint not discharged from the nozzles 54; a removal filter 90 (first filter) provided in the intermediate portion of the paint supply path 105 and configured to remove foreign matter in the paint; and a deaerating module 80 (second filter) provided on the downstream side of the paint supply path 105 compared to the removal filter (first filter) and configured to separate dissolved gas from the paint. Further, a bypass flow path 115 configured to circulate paint in parallel with the nozzle head 53 is provided on the downstream side of the flow path compared to the removal filter 90 (first filter), and an on-off valve 116 is provided in the bypass flow path 115. In addition, the on-off valve 116 opens and closes under the control of the control unit 130 and when paint is not discharged from the nozzle head 53, the control unit 130 opens the on-off valve 116 and circulates the paint to the bypass flow path 115. In addition, the return flow path 107 is connected to at least a location on the upstream side of the deaerating module 80 (second filter) of the paint supply path 105, and the paint which has circulated through the bypass flow path 115 is again supplied to the paint supply path 105 via the return flow path 107, so that the paint passes through at least the deaerating module 80 (second filter) again.

In this configuration, when paint is not discharged from the nozzles 54, the on-off valve 116 is in an open state such that paint flows through the bypass flow path 115 and the paint again flows to the paint supply path 105 via the return flow path 107. Then, the paint again passes through the deaerating module 80 (second filter). Thereby, air introduction from the nozzles 54 of the nozzle head 53 can be prevented for example during the color change for changing the type of the paint storage portion 101 or during filling paint into the paint supply mechanism 100. Therefore, it is possible to prevent the state in which paint cannot be discharged from the nozzles 54 due to introduced air to arise.

In addition, if air is introduced from the nozzles 54 during the above-mentioned color change or during filling paint into the paint supply mechanism 100, the operation times of the supply pump 108 and the suction pump 120 are extended to remove the air. However, since air can be prevented from being introduced from the nozzles 54 by flowing paint in parallel with the nozzle head 53 via the bypass flow path 115 as described above, the operation times of the supply pump 108 and the suction pump 120 can be shortened, and wear of these supply pump 108 and the suction pump 120 can be reduced.

In addition, dissolved gas dissolved in paint can be sufficiently removed (deaerated) by passing the paint through the deaerating module 80 (second filter). In addition, in the paint supply mechanism 100, paint circulates on a route through the deaerating module 80 (second filter) and the bypass flow path 115 without passing through the nozzle head 53, thereby further promoting the removal of dissolved gas (deaeration) in the paint. Therefore, it is possible to prevent air originated from the dissolved gas from accumulating in the nozzles 54 and it is possible to prevent the arising of a state in which for example paint is not pushed out from the nozzles 54.

In addition, in this embodiment, on the upstream side of the removal filter 90 (first filter), a supply pump 108

(pressurizing device) is provided, which applies a positive pressure to the paint, and on the downstream side of the paint supply path 105 as compared to the supply pump 108 (pressurizing device) and on the upstream side of the removal filter 90 (first filter), a pressure sensor S2 is provided, which detects the pressure of the paint flowing through the paint supply path 105. Further, based on the detection signal sent by the pressure sensor S2 to the control unit 130, the control unit 130 controls the operation of the supply pump 108 (pressurizing device) so that the supply pump 108 (pressurizing device) discharges paint at a predetermined pressure.

With such a configuration, paint can be supplied to the removal filter 90 (first filter) and the deaerating module 80 (second filter) at an appropriate pressure by controlling the supply pump 108 (pressurizing device) to discharge the paint at a predetermined pressure through by the control unit 130. Thereby, it is possible to prevent excessive pressure from being applied to these removal filter 90 (first filter) and the deaerating module 80 (second filter), and it is also possible to prevent damage or shortening of the service life of the removal filter 90 (first filter) and the deaerating module 80 (second filter).

Further, in the present embodiment, the nozzle head 53 is mounted on the tip side of the robot arm R1 configured to move the nozzle head 53 to the desired position and the desired posture, and the removal filter 90 (first filter) and the deaerating module 80 (second filter) are mounted to the intermediate portion (the second revolving arm 26) of the robot arm R1.

Here, it may also be considered to provide the removal filter 90 (first filter) and the deaerating module 80 (second filter), in a manner similar to the nozzle head 53, to the tip side of the robot arm R1 instead of the intermediate portion of the robot arm R1. However, in this configuration the weight of the nozzle head 53 side increases. That is to say, since the weight of the tip side of the robot arm R1 increases, corresponding measures in terms of strength and the like of the robot arm R1 is required. In this regard, in the present embodiment, the removal filter 90 (first filter) and the deaerating module 80 (second filter) are mounted to the intermediate portion of the robot arm R1, so that measures in terms of strength and the like can be reduced compared with the case where they are mounted to the tip side of the robot arm R1. In addition, the motion performance of the robot arm R1 can be improved.

In addition, in the present embodiment, the deaerating module 80 (second filter) includes hollow fiber membranes 83, the deaerating module 80 (second filter) is accommodated in a sealed case 81, the deaerating module 80 (second filter) includes the sealed case 81, and the robot arm R1 is provided with a module mounting portion 261 (engagement portion) engaged with a side surface of the case 81.

With such a configuration, a packaged deaerating module 80 (second filter) can be easily engaged to the module mounting portion 261 (engagement portion), and the labor for mounting the deaerating module 80 (second filter) to the module mounting portion 261 can be reduced.

In addition, in the present embodiment, the nozzle head 53 is provided with a circulation path C1 in which when the paint supplied to the nozzle head 53 is not discharged from the nozzles 54 the paint returns to the return flow path 107.

In this manner, settling of paint can be prevented even when paint is not discharged from the nozzles 54 during painting by providing the circulation path C1 in the nozzle head 53 in addition to the bypass flow path 115 arranged in parallel with the nozzle head 53.

4. Modified Examples

Although one embodiment of the present invention has been described above, various modifications can be made to the present invention except for the above embodiment. Hereinafter, a modified example will be described.

Figure 11:
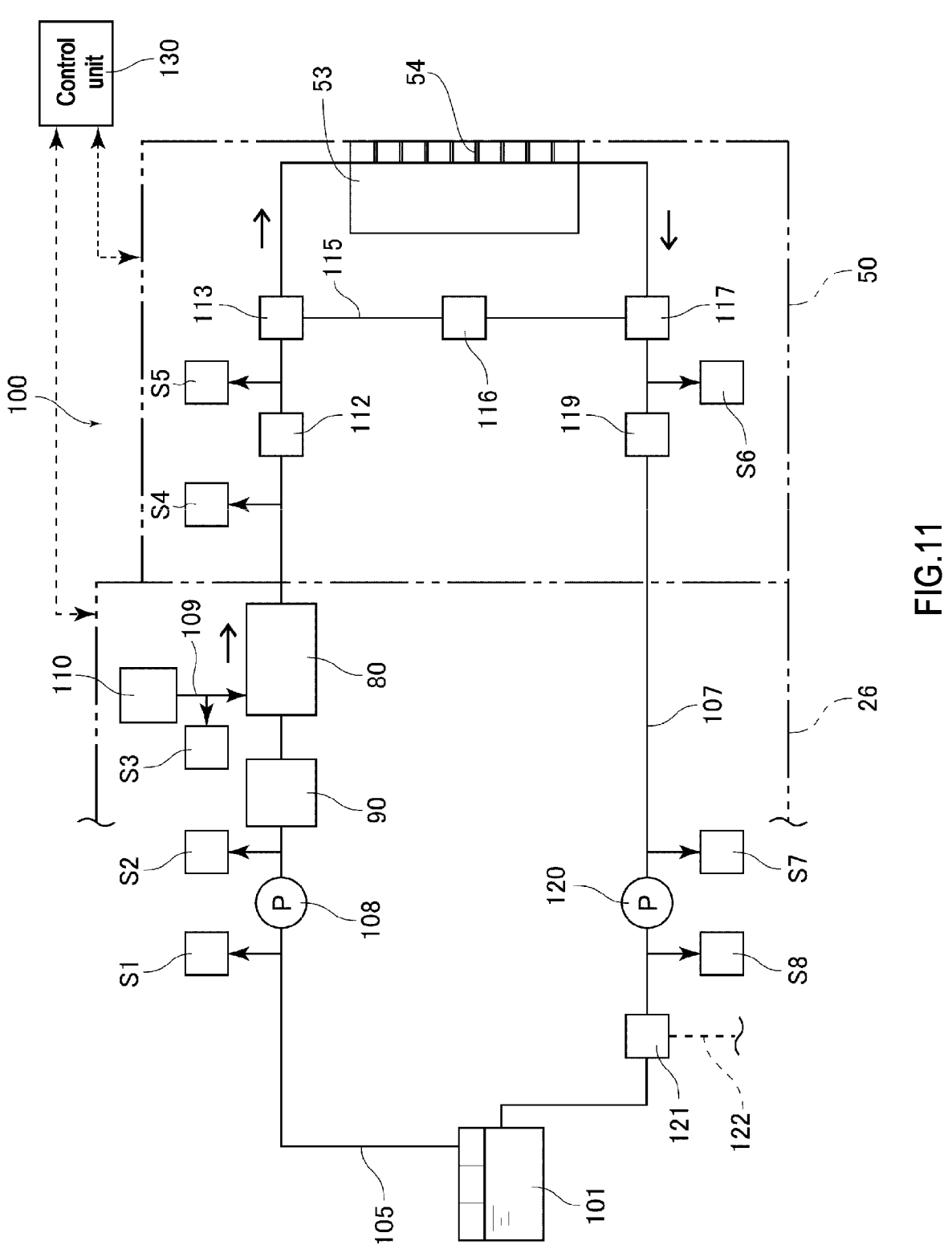
FIG. 11 is a sectional view showing the schematic configuration of a deaerating module according to a modified example of the present invention.

In the above-mentioned embodiment the paint supply mechanism 100 shown in FIG. 9 is described. However, the paint supply mechanism 100 is not limited to the configuration shown in FIG. 9. The painting robot 10 exemplifies an example of another paint supply mechanism 100. The paint supply mechanism 100 shown in FIG. 11 may also be used. The configuration shown in FIG. 11 differs from the configuration shown in FIG. 9 in that it is not provided with the connection path 102, three-way valve 103 and sub-tank 106. In addition, the paint supply path 105 and the return flow path 107 are connected to the paint storage portion 101. Therefore, the paint flowing through the return flow path 107 via the nozzle head 53 or the bypass flow path 115 is returned to the paint storage portion 101. That is to say, the paint can circulate via the paint storage portion 101.

In addition, in the above-mentioned embodiment, the deaerating module 80 corresponding to the second filter illustrated an external perfusion system in FIG. 8. However, the deaerating module may also use an internal perfusion system.

In addition, in the above-mentioned embodiment, the return flow path 107 of the paint supply mechanism 100 is provided with the paint regulator 119 and the pressure sensor S6. However, a configuration in which the paint regulator 119 the pressure sensor S6 and the like are omitted may also be adopted.

In addition, in the above-mentioned embodiment, the deaerating module 80 is mounted at the intermediate portion of the robot arm R1. However, the deaerating module 80 may also be mounted to a portion other than the robot arm R1. For example, the deaerating module 80 may be mounted on the base 21 side or the leg portion 22 side, and the deaerating module 80 may also be provided on the setup surface on which the painting robot 10 is set.

REFERENCE SIGNS LIST

10 painting robot; 20 robot body; 21 base; 22 leg portion; 23 rotating shaft portion; 24 rotating arm; 25 first revolving arm; 26 second revolving arm; 27 wrist portion; 30 chuck portion; 40 paint supply portion; 50 nozzle head unit; 51 head cover; 52 nozzle discharging surface; 52*a* side surface; 53 nozzle head; 53*a* side surface; 53*b* top surface; 54 nozzle; 54A nozzle; 54B nozzle; 55 nozzle column; 55A first nozzle column; 55B second nozzle column; 57 supply side large flow path; 58 column-direction supply flow path; 59 nozzle pressurizing chamber; 59*a* nozzle supply flow path; 59*b* nozzle exhaust flow path; 60 column-direction exhaust flow path; 61 exhaust side large flow path; 62 piezoelectric substrate; 63*a* piezoelectric ceramic layer; 63*b* piezoelectric ceramic layer; 64 common electrode; 65 individual electrode; 70 explosion-proof housing; 71 cylindrical portion; 72 expanded portion; 72*a* expanded outer peripheral wall; 73 front cover; 74 gas introduction opening; 75 gas exhaust opening; 76 ceiling surface; 81 gas supply coupling (corresponding to the gas supplier); 82 gas control valve (corresponding to the gas exhauster); 83 pressurizing pipeline; 84 pressurizer; 90 heat radiation plate (corresponding to the heat radiator); 100 temperature sensor (corresponding to the temperature measuring device); 110 circuit breaker (corresponding to the electric power cut-off device); 120 electric power supply circuit (corresponding to the electric power supplier); 130 main control unit; 140 head control unit; 150 valve control unit (corresponding to the controller); 160 pressurizer control unit; 170 driving driver; 200 vehicle; PI internal space; R1 robot arm; S1~S8 pressure sensor.

What is claimed is:

1. A painting robot configured to discharge paint towards a painting object from a plurality of nozzles to perform painting, comprising:

a nozzle head comprising:

a paint supply side flow path, at least one column-direction supply flow path fluidly connected to the paint supply side flow path, at least one column-direction exhaust flow path, and a paint exhaust side flow path fluidly connected to the at least one column-direction exhaust flow path, wherein the plurality of nozzles is fluidly connected between the at least one column-direction supply flow path and the at least one column-direction exhaust flow path, the nozzle head discharging the paint from each of the plurality of nozzles by driving of a piezoelectric substrate, the paint not discharged from the plurality of nozzles configured to converge into the paint exhaust side flow path from the at least one column-direction exhaust flow path;

a paint supply path fluidly connected to the paint supply side flow path upstream of the nozzle head;

a return flow path fluidly connected to the paint exhaust side flow path downstream of the nozzle head, the return flow path configured to recover the paint from the paint exhaust side flow path not discharged from the plurality of nozzles;

a first filter provided in an intermediate portion of the paint supply path and configured to remove foreign matter in the paint;

a second filter provided on a downstream side of the paint supply path compared to the first filter and configured to separate dissolved gas from the paint;

a bypass flow path fluidly connected to the intermediate portion of the paint supply path upstream of the nozzle head and to an intermediate portion of the return flow path downstream of the nozzle head such that the bypass flow path is connected in parallel with the nozzle head, the bypass flow path configured to circulate the paint in parallel with the nozzle head such that the paint bypasses the paint supply side flow path and the paint exhaust side flow path of the nozzle head;

a three-way valve connected to the intermediate portion of the paint supply path upstream of the nozzle head and connected to the bypass flow path, wherein, when in a first state during painting, the paint from the paint supply path is directed to the nozzle head through the three-way valve, wherein, when in a second state when painting is not being performed, the paint from the paint supply path is directed to the bypass flow path to circulate the paint in parallel with the nozzle head;

wherein an on-off valve is provided in the bypass flow path, wherein the on-off valve opens and closes under control of a control unit, and wherein, when the paint is not discharged from the nozzle head, the control unit opens the on-off valve and circulates the paint to the bypass flow path; and wherein the return flow path is connected to at least a location on an upstream side of the second filter of the paint supply path;

wherein the paint which has circulated through the bypass flow path is again supplied to the paint supply path via the return flow path, so that the paint passes through at least the second filter again.

2. The painting robot of claim 1, wherein, on an upstream side of the first filter, a pressurizing device is provided, which applies a positive pressure to the paint, wherein, on the downstream side of the paint supply path as compared to the pressurizing device and on the upstream side of the first filter, a pressure sensor is provided, which detects a pressure of the paint flowing through the paint supply path, and wherein, based on a detection signal sent by the pressure sensor to the control unit, an operation of the pressurizing device is controlled so that the pressurizing device discharges the paint at a predetermined pressure.

3. The painting robot of claim 1, wherein the nozzle head is mounted on a tip side of a robot arm configured to move the nozzle head to a desired position and a desired posture, and the first filter and the second filter are mounted to the intermediate portion of the robot arm.

4. The painting robot of claim 3, wherein the second filter includes a hollow fiber membrane, wherein the second filter includes a sealed case, and wherein the robot arm is provided with an engagement portion engaged with a side surface of the sealed case.

5. The painting robot of claim 1, wherein the nozzle head is provided with a circulation path in which, when the paint supplied to the nozzle head is not discharged from the plurality of nozzles, the paint returns to the return flow path via the at least one exhaust flow path.

6. The painting robot of claim 2, wherein the nozzle head is provided with a circulation path in which, when the paint supplied to the nozzle head is not discharged from the plurality of nozzles, the paint returns to the return flow path via the at least one exhaust flow path.

7. The painting robot of claim 3, wherein the nozzle head is provided with a circulation path in which, when the paint supplied to the nozzle head is not discharged from the plurality of nozzles, the paint returns to the return flow path via the at least one exhaust flow path.

8. The painting robot of claim 4, wherein the nozzle head is provided with a circulation path in which, when the paint supplied to the nozzle head is not discharged from the plurality of nozzles, the paint returns to the return flow path via the at least one exhaust flow path.

9. The painting robot of claim 2, wherein the nozzle head is mounted on a tip side of a robot arm configured to move the nozzle head to a desired position and a desired posture, and wherein the first filter and the second filter are mounted to the intermediate portion of the robot arm.

10. The painting robot of claim 9, wherein the second filter includes a hollow fiber membrane, wherein the second filter includes a sealed case, and wherein the robot arm is provided with an engagement portion engaged with a side surface of the sealed case.

11. The painting robot of claim 9, wherein the nozzle head is provided with a circulation path in which, when the paint supplied to the nozzle head is not discharged from the plurality of nozzles, the paint returns to the return flow path.

12. The painting robot of claim 10, wherein the nozzle head is provided with a circulation path in which, when the paint supplied to the nozzle head is not discharged from the plurality of nozzles, the paint returns to the return flow path via the at least one exhaust flow path.

13. The painting robot of claim 1, wherein, when the three-way valve is in the second state, the paint from the paint supply path is not supplied to the plurality of nozzles of the nozzle head.

\* \* \* \* \*